United States Patent [19]

DePue et al.

[11] Patent Number: 5,372,638
[45] Date of Patent: Dec. 13, 1994

[54] ALUMINUM FLAKE PIGMENT TREATED WITH METAL SALTS AND COATINGS CONTAINING THE SAME

[75] Inventors: Jeffrey S. DePue, Canton; Clint W. Carpenter, Royal Oak; Lynne G. Bemer, Northville, all of Mich.

[73] Assignee: BASF Corporation, Southfield, Mich.

[21] Appl. No.: 982,352

[22] Filed: Nov. 27, 1992

[51] Int. Cl.$^5$ ............................................. C09C 1/64
[52] U.S. Cl. .................................. 106/404; 428/402; 428/403; 428/697
[58] Field of Search ................ 106/404; 428/402, 403, 428/697

[56] References Cited

U.S. PATENT DOCUMENTS

| | | | |
|---|---|---|---|
| 5,057,156 | 10/1991 | Kuwajima et al. | 106/404 |
| 5,093,391 | 3/1992 | Barsotti et al. | 523/400 |
| 5,151,125 | 9/1992 | Kuwajima et al. | 106/404 |
| 5,215,579 | 6/1993 | Keemer et al. | 106/404 |

OTHER PUBLICATIONS

D. R. Arnott et al, Cationic-Film-Forming Inhibitors for the Protection of the AA 7075 Aluminum Alloy Against Corrosion in Aqueous Chloride Solution, Jan. 1989, *Corrosion*, v. 45, No. 1.

*Primary Examiner*—Mark L. Bell
*Assistant Examiner*—Scott L. Hertzog
*Attorney, Agent, or Firm*—Anne Gerry Sabourin

[57] ABSTRACT

The invention is an aluminum flake pigment particle, surface treated transition metal or rare earth metal salt. The treated pigment particle has been found to be highly useful in water-borne coating compositions having a basic pH. The treated pigment particles experience significantly less hydrogen gassing in a high pH environment, and in water-borne coating compositions than untreated aluminum flake pigment particles. The treated pigment particles are also useful when combined with a pigment dispersant composition to further inhibit corrosion and gassing when the pigments are used in a coating composition.

15 Claims, No Drawings

ALUMINUM FLAKE PIGMENT TREATED WITH METAL SALTS AND COATINGS CONTAINING THE SAME

FIELD OF THE INVENTION

The present invention pertains to the field of aluminum flake pigments made corrosion resistant by treatment with transition metal salts, rare earth metal salts or mixtures thereof. The invention also pertains to coating compositions containing the treated aluminum flake pigments.

BACKGROUND OF THE INVENTION

Aluminum flake pigments are used extensively in coating compositions. Aluminum flake pigments are slightly reactive in an aqueous environment having a basic pH, such as aqueous coating compositions. The aluminum reacts with water to produce hydrogen gas and aluminum hydroxide. The formation of aluminum hydroxide occurs relatively rapidly with aluminum pigments due to the high surface to mass ratio of the small particles. The reaction is a form of corrosion and converts the pigment to a hydrated oxide form unsuitable for pigment use, as it destroys the metallic pigmentation properties of the mirror-like particles. The amount of corrosion is measured by the amount of hydrogen gas produced over a given period of time. Corrosion is exacerbated since the reaction of the aluminum in water results in the continuous formation of $H^+$ and $OH^-$ ions. The $H^+$ ions attack and corrode the aluminum and the $OH^{30}$ ions cause the pH of the environment to further increase. In coating compositions, contact of the aluminum pigment with the environment is continuous over extended periods of time, since coatings containing the pigment are often stored for 6 months or more before application. Corrosion inhibition can be achieved if the rates of these reactions, or any partial steps involved, can be decreased.

It has been found that transition metal salts and rare earth metal salts inhibit corrosion in the aluminum flake pigment particles in a basic aqueous environment. It is thought that the metal salts inhibit corrosion due to a compact film of rare earth metal oxides and hydroxides that replace the natural aluminum oxide film on the surface of the aluminum flake pigment. It is hypothesized that the transition metal or rare earth metal oxide/hydroxide film forms at local cathodic sites on the surface, where the alkaline conditions generated by oxygen reduction reactions cause the aluminum oxide to dissolve and the transition metal or rare earth metal oxide to precipitate.

It has further been discovered that aluminum flake pigment treated with the transition metal and/or rare earth metal salts are highly effective to inhibit the corrosion of the pigment particles in water-borne coating compositions. This is significant because the water-borne coating compositions in use today have a basic pH. The pH of acrylic coating compositions typically ranges from 8.0-9.0, and the polyurethane coating compositions have a pH typically ranging from 7.5 to 8.0. The high pH of water-borne coating systems speeds up the reaction which produces the hydrated oxide aluminum and results in serious degradation or corrosion of aluminum flake pigment used in metallic coatings.

The pigments treated with transition metal and rare earth metal salts demonstrate excellent dispersibility in coatings. The use of the treated aluminum pigment does not result in any loss of adhesion to other layers or any cohesive failure within the coating layers. The coatings are particularly useful for automotive coating applications.

SUMMARY OF THE INVENTION

The present invention relates to the discovery that aluminum flake pigment particles that are not coated or surface treated with chromates or other corrosion inhibiting agents, sometimes referred to as "bare" aluminum, can be treated with transition metal and/or rare earth metal salts in solution, to inhibit corrosion as evidenced by decreased hydrogen gassing in a basic pH environment. The particularly useful transition metal and rare earth and metal salts include transition metals having atomic numbers 21-28; 39-42; 57 and 72-74; and the lanthanide series of rare earth metals having atomic numbers of from 58 to 71.

The aluminum flake pigment particles are treated with the metal salt by forming a slurry of aluminum pigment and a solution of the metal salt, water and solvent. The pigment remains in mixture with the solution for a period of time ranging from 1 hour to 6 days to form the protective rare earth metal coating on the aluminum flake pigment.

In an alternative embodiment, the pigment may also be treated with a polymeric dispersant having a phosphate functional compound, a silane functional compound or a mixture of these, to provide additional protection from corrosion and improved dispersibility of the pigment in a coating composition.

The aluminum flake pigment particles treated with the metal salts of the present invention are utilized in a water-borne coating compositions. Particularly preferred are coating compositions containing a film forming resin which is an acrylic or a polyurethane resin.

DETAILED DESCRIPTION OF THE INVENTION

The present invention is directed to a composition comprising aluminum flake pigment particles treated with a transition metal salt and/or rare earth metal salt, a method for treating the aluminum flake pigment and a coating containing the treated pigment.

The aluminum flake pigment of the present invention is not coated or surface treated with chromates or other corrosion inhibiting agents. For this reason the untreated aluminum pigment is sometimes referred to as "bare" aluminum. The pigment is received from the supplier in a solution of mineral spirits. The mineral spirits are removed from the pigment during the process of treating the pigment with rare earth metal salts. Aluminum particles as contemplated for use with the invention generally have a surface area that may range from about 0.05 to about 15 $m^2/g$ of aluminum. The aluminum particles that are specifically contemplated as preferred aspects of the invention are aluminum flakes, powders and granules. Aluminum flake pigments are particularly preferred in the waterborne basecoat compositions. In a preferred aspect, the surface area of the aluminum is from about 2 to about 14.5 $m^2/g$. The average particle size of the aluminum flake pigment is preferably from 1 to 70 microns, more preferably from 5 to 50 microns.

Commercial aluminum flake pigment pastes are available from companies such as Silberline, Tamaqua, Pa. Aluminum Company of America, Pittsburgh, Pa.

Obron Atlantic Corp., Painesville, Ohio Reynolds Metals Company, Richmond, Va. and Toyo Aluminum KK, Higashiku, Osaka, Japan in various grades, types and particle sizes. For certain waterborne paint applications, such as automotive basecoats, non-leafing aluminum flake pigments, such as Sparkle Silver® 5245 AR aluminum paste from Silberline or 8160 AR aluminum paste from Obron Atlantic Corp. have been utilized.

According to the present invention, the aluminum flake pigment is treated with a transition metal and/or rare earth metal salt solution comprising a salt selected from the group consisting of salts of transition metals having atomic numbers 21-28; 39-42; 57 and 72-74; and salts of the lanthanide series of rare earth metals having atomic numbers of from 58 to 71. Preferably the salts used for treating the aluminum pigment are trivalent and tetravalent salts of cerium, yttrium and lanthanum salts. Examples of these include cerium sulfate, cerium triacetate, cerium isopropoxide, ammonium cerium nitrate, yttrium triacetate, lanthanum triacetate, and cerium dioxide. The metal salt is utilized in an amount between 0.15% and 10.0% by weight based on total pigment weight.

It is highly unexpected that particularly the tetravalent cerium salts would be effective corrosion inhibitors in the present invention, since these generally precipitate out of solution as the $Ce^{+4}$ ion or in the form of cerium hydroxide $Ce(OH)_4$.

The salt solution preferably contains deionized water and a solvent such as butyl cellosolve, n-propanol, propylene glycol monomethyl ether or propylene glycol mono butyl ether. The water is present to dissolve the metal salt. The solvent is present to effectively disperse the pigment particles to allow maximum contact of the pigment particles with the salt solution.

The aluminum flake pigment and salt solution are combined to form a slurry. The slurry comprises aluminum flake pigment present in an amount between 5.0% and 20% by weight, metal salt present in an amount between 0.3% and 1.0% by weight, water present in an amount between 2.0% and 80% by weight, and solvent present in an amount between 5.0% and 80% by weight, where all weights are based on total weight of the aluminum slurry. The aluminum pigment remains in contact with the salt solution for a period of 0.5 hour to 6 days. The contact time must be adequate for formation of a rare earth metal or transition metal oxide coating on the aluminum flake pigment. The aluminum flake pigment is subsequently filtered and dried to provide the transition metal or rare earth metal treated aluminum flake pigment composition.

In an alternative embodiment the aluminum flake pigment slurry described above may also include a dispersant compound as described in U.S. Pat. No. 5,156,677 to Carpenter et al. The dispersant further aids in reducing hydrogen gassing and in dispersing the pigment in a pigment paste or a coating composition. The dispersant compounds have a polymeric backbone having at least two different substituents. The first substituent has a terminal functionality, that is either silane or phosphorus functional compound. The silane or phosphorus functional compound interacts with the surface of the metal pigment. The second substituent has a hydrophobic portion to inhibit the migration of water to the aluminum surface, and a terminal hydrophilic portion to aid in dispersing the pigment in an aqueous environment.

The polymeric backbone of the dispersant may be, for example, an acrylic, urethane, polyester, alkyd or epoxy polymer or oligomer. Acrylic and urethane backbones are preferred. The polymeric backbone when synthesized includes thereon at least two isocyanate groups or latent isocyanate groups. This may be accomplished by either copolymerizing into the polymeric backbone a monomer with isocyanate or latent isocyanate functionality, or by reacting a group with isocyanate or latent isocyanate functionality onto the polymer. The reaction of the isocyanate or latent isocyanate functionality with an isocyanate-reactive functionality of the first substituent or the second substituent forms the appropriate linking group.

Illustrative examples of isocyanate or latent isocyanate functional urethane backbones of the dispersant are urethane polymers with terminal isocyanate or latent isocyanate functionality. The urethane polymers may be synthesized by known techniques, such as bulk polymerization or, preferably, solution polymerization, from polyisocyanates and polyfunctional compounds reactive with polyisocyanates, including, for example, polyols, polyamines, and aminoalcohols; with the proviso that the sum of equivalents of isocyanate and latent isocyanate groups used exceeds the equivalents used of polyfunctional compounds reactive with polyisocyanates. The polyisocyanate may be, for example, isophorone diisocyanate, -phenylene diisocyanate, biphenyl 4,4'-diisocyanate, meta-xylylene isocyanate, toluene diisocyanate, 3,3'-dimethyl-4,4'-biphenylene diisocyanate, 1,4-tetramethylene diisocyanate, 1,6-hexamethylene diisocyanate, 2,2,4-trimethylhexane-1,6-diisocyanate, 1,3-bis -[2-(-(isocyanato)propyl]benzene (also known as tetramethylxylyldiisocyanate, TMXDI) methylene bis-(phenyl isocyanate), 1,5-naphthalene diisocyanate, bis(isocyanatoethyl fumarate), methylene bis-(4-cyclohexyl isocyanate), and biurets or isocyanurates of any of these.

The polyfunctional compounds reactive with polyisocyanates may include any of diols, triols, or alcohols of higher functionality, such as ethylene glycol, propylene glycol, 1,4-butanediol, 1,6-hexanediol, neopentyl glycol, trimethylolethane, trimethylolpropane, pentaerythritol, polyester polyols, polyether polyols, and the like; polyamines, such as ethylene diamine and diethylene triamine; or aminoalcohols, such as diethanolamine and ethanolamine.

Preferably, one of either the polyisocyanate or the polyfunctional compound reactive with polyisocyanate has functionality (including latent functionality) greater than two. The reactants are apportioned so that the polyurethane copolymer has terminal isocyanate functionality and a weight average molecular weight preferably of at least 1000, and more preferably from 1000 to 20,000. The weight average molecular weight is determined by gel permeation chromatography using polystyrene standards.

Illustrative examples of isocyanate or latent isocyanate functional acrylics are copolymers of an ethylenically unsaturated monomer containing an isocyanate or latent isocyanate group. The copolymers may be prepared by using conventional techniques, such as free radical polymerization cationic polymerization, or anionic polymerization, in, for example, a batch or semi-batch process. For instance, the polymerization may be carried out by heating the ethylenically unsaturated monomers in bulk or in organic solution in the presence of a free radical source, such as an organic peroxide or azo compound and, optionally, a chain transfer agent for a batch process; or, alternatively, the monomers and initiator(s) may be fed into the heated reactor at a controlled rate in a semi-batch process.

In a particularly preferred embodiment, the ethylenically unsaturated monomer containing an isocyanate group is meta-isopropenyl-a, a-dimethylbenzyl isocyanate. Meta-isopropenyl-a,a-dimethylbenzyl isocyanate is available from American Cyanamid Company, Wayne, N.J. under the trade name "TMI (Meta) unsaturated aliphatic isocyanate," and is described in American Cyanamid Company's publication "TMI (Meta) unsaturated aliphatic isocyanate", publication number 2-849 1/88. Other copolymerizable monomers can be acrylonitrile, acrylic or methacrylic acid, alkyl esters of acrylic or methacrylic acid, e.g., ethyl acrylate, butyl acrylate, 2-ethylhexyl acrylate, methyl methacrylate, butyl methacrylate, propyl methacrylate, lauryl methacrylate, 2-ethylhexyl methacrylate, and the like; and vinyl monomers, such as styrene, vinyl toluene, maleic anhydride, vinyl propionate, and the like. The choice of monomers is not critical, so long as no monomer contains a group reactive with the isocyanate group.

The polymerization reaction for forming the dispersant copolymer may be, for example, a free radical polymerization carried out in solution using such solvents as toluene, xylene, ethyl acetate, acetone, methyl isobutyl ketone, methyl ethyl ketone, methyl propyl ketone, methyl amyl ketone, mineral spirits, ethylene or propylene glycol ether acetates, and other compatible solvents. Preferred solvents are ketones. Typical free radical sources are organic peroxides such as dialkyl peroxides, peroxyesters, peroxydicarbonates, diacyl peroxides, hydroperoxides, and peroxyketals; and azo compounds such as 2,2'-azobis ( 2-methylbutanenitrile) and 1,1'-azobis (cyclohexanecarbonitrile). Typical chain transfer agents are mercaptans such as octyl mercaptan, n- or tert-dodecyl mercaptan, thiosalicyclic acid, mercaptoacetic acid, and mercaptoethanol; halogenated compounds, and dimeric alpha-methyl styrene. The free radical polymerization is usually carried out at temperatures from about 20° C. to about 200° C., preferably from 120° C. to 160° C. Generally, the amount of meta-isopropenyl-α, α-dimethylbenzyl isocyanate that may be incorporated into the addition polymer increases with increasing reaction temperature. The reaction may conveniently be done at the temperature at which the solvent or solvent mixture refluxes, although reflux is not necessary to the reaction. The initiator should be chosen to match the temperature at which the reaction is carried out, so that the half-life of the initiator at the reaction temperature should preferably be no more than thirty minutes.

The solvent or solvent mixture is generally heated to the reaction temperature and the monomers and initiator(s) are added at a controlled rate over a period of time, usually between 2 and 6 hours. A chain transfer agent or additional solvent may be added concurrently with the monomers and initiator(s). The mixture is usually held at the reaction temperature after the additions for a period of time to complete the reaction. Optionally, additional initiator may be added during the latter stages of the addition or after the addition is completed to ensure complete conversion. The acrylic copolymer preferably has a weight average molecular weight of at least 1000, and more preferably from 2000 to 50,000. The weight average molecular weight is determined by gel permeation chromatography using polystyrene standards.

To form the dispersant, the isocyanate-functional polymeric backbone is adducted with the silane or phosphorus first substituent and the second substituent having hydrophilic and hydrophobic portions. An amount of the first substituent is included sufficient to firmly anchor the polymer to the surface of the pigment. This amount is dependent on factors such as the size and nature of the metallic particle, and can readily be determined by one skilled in the art. The amount of the second substituent present is chosen to optimize the dispersibility and gassing resistance of the treated flake.

Silane substituents of the invention are formed by reacting silane-containing materials having isocyanate-reactive groups with isocyanate groups of the polymeric backbone. The isocyanate-reactive groups are selected from hydroxyl, amino, mercapto, or oxirane functional groups. Examples of such materials useful for forming the substituents compatible with the above-mentioned requirements are 3-aminopropyltrimethoxysilane, 3-aminopropyltriethoxysilane, 3-(N-methylamino) propyltrimethoxysilane 3-mercaptopropyltrimethoxysilane, and (3-glycidoxypropyl)methyldiethoxysilane and the like. Preferred are amino-functional silanes, especially 3-aminopropyltrimethoxysilane, 3-aminopropyltriethoxysilane, and 3-(N-methylamino) propyltrimethoxysilane. Silane-containing materials that may be utilized in making the compounds of the invention are commercially available from, for example, Hüls America, Inc.' Piscataway, N.J. or from Dow Corning Corp., Midland, Mich. or from Union Carbide Corp., Danbury, Conn.

When the first substituent is a phosphorus compound it is attached to the polymeric backbone by reaction with a material containing a hydroxyl group and at least one other group capable of reacting with isocyanate or latent isocyanate functionalities on the polymeric backbone. The material containing these groups is a straight or branched compound of one to twelve carbon atoms. The group capable of reacting with isocyanate or latent isocyanate functionalities may be hydroxyl, amino, or mercapto; said groups forming by reaction radicals of —O—, —NA$_5$—, and —S—, respectively. Representative examples of useful materials are diols, triols, and higher functionality polyols, such as ethylene glycol, propylene glycol, butylene glycol, neopentyl glycol, trimethylolethane, trimethylolpropane, 1,6-hexanediol, and pentaerythritol; mercaptoalcohols, such as mercaptoethanol, mercaptopropanol, mercaptobutanol, mercaptophenol, or 3-mercapto-1,2-propanediol; and aminoalcohols, such as diethanolamine, methylethanolamine, and 6-amino-l-hexanol. Preferably, an amino group or hydroxyl group is chosen to react with the isocyanate. Aminoalcohols are particularly useful.

The aminoalcohol is first reacted with the isocyanate functional groups on the polymeric backbone. The amino group is more reactive to isocyanate than the hydroxyl group. The difference in reactivity is exploited to minimize any crosslinking between polymeric backbones. The reaction between amino and isocyanate groups may be accomplished under mild conditions, such as by stirring the two together for five minutes at room temperature.

The remaining alcohol group may be converted to the desired phosphate through various reaction schemes, such as reaction with polyphosphoric acid, phosphoric acid, phosphorous acid, or phosphorous pentoxide, or analogs that have phosphorous atoms monosubstituted with an alkyl of one to ten carbon atoms, an alkoxy of one to ten carbon atoms, an alkoxyalkoxy of two to ten carbon atoms, an alkanoyloxy of two to ten carbon atoms, or a halogen. One preferred method is by addition of polyphosphoric acid at temperatures between about 25° C. and about 200° C. Other well-known methods, using materials such as phosphorus pentachloride or phosphorus oxychloride, are available.

The second substituent is a structure having both a hydrophobic polyester or polyamide residue and a hydrophilic polyethylene oxide or polyethylene oxide/polyalkylene oxide copolymer. The second substituent is linked to the polymeric backbone by the reaction with the isocyanate group on the polymeric backbone.

The second substituent may be formed by the reaction of a lactone, lactam, amino acid, or hydroxy acid, or a polymer formed using any of these, with an alkoxy poly(oxyalkylene) alcohol or with an alkoxy poly(oxyalkylene) amine.

The second substituent may be formed by polymerizing, for example, ε-caprolactone onto an alkoxy poly(oxyalkylene) alcohol. In a particularly preferred embodiment, one equivalent of the alkoxy poly(oxyalkylene) alcohol is reacted with from 20 to 50 equivalents of ε-caprolactone. The polymerization temperatures are typically between 100° C. and 150° C. Any of a number of catalysts known to be useful in esterification reactions may be utilized, such as tetrabutyl titanate or titanium diisopropoxide-bis(2,4-pentanedionate). For example, tetrabutyl titanate may be used advantageously at levels of from 0.05% to 0.5%, based on weight of reactants. The reaction may be done in the presence or absence of solvent. Substituents using lactams, such as caprolactam, hydroxy acids, such as 12-hydroxystearic acid, or amino acids, such as 12-aminododecanoic acid, may be prepared in a similar manner using methods well-known to the art.

The alkoxy poly(oxyalkylene) alcohol or alkoxy poly(oxyalkylene) amine employed can be formed by the alkoxyl-initiated polymerization of ethylene oxide or mixtures of ethylene oxide with other epoxides of up to ten carbon atoms, such as propylene oxide or butylene oxide. The polymerization may be terminated by addition of an aziridine, such as propylene aziridine, to form the alkoxy poly(oxyalkylene) amine. The residue of the alkoxy poly(oxyalkylene) alcohol or amine contained in the compound, is either alkoxy polyoxyethylene or an alkoxy polyoxyethylene/polyoxyalkylene copolymer.

The order in which the first and second substituents are reacted onto the polymeric backbone is not critical, and, in general, whether the two substituents are added simultaneously or sequentially will depend upon the particular functionalities chosen. In the case of latent isocyanate groups, such as blocked isocyanate groups, the conditions must allow the generation of the isocyanate functionality. The reactions of forming the first and second substituents and adducting them onto the polymeric backbone may be done neat or in solution. Addition of an inert solvent is preferred when the viscosity would otherwise be too high to achieve adequate mixing. Solvents containing hydroxyl groups and other active hydrogens are not preferred. Useful solvents include aromatic and aliphatic hydrocarbons, esters, ethers, and ketones. Such solvents as toluene, xylene, ethyl acetate, acetone, methyl isobutyl ketone, methyl ethyl ketone, methyl propyl ketone, methyl amyl ketone, mineral spirits, ethylene or propylene glycol ether acetates, and other compatible solvents may be useful.

An alternative to reacting the first and second substituents on to the polymeric backbone is to include either the first substituent which is a silane or phosphorus functional compound or the second substituent during he polymerization of the polymer backbone, and to adduct the other onto a polymer functionality afterward. The compounds of the invention are effective as dispersants for the aluminum flake pigment at levels of from 1% to 40%, preferably from 10% to 30% by weight, based on the total weight of the metallic flake pigment and functional compounds. It is particularly advantageous to use the silane functional and phosphorus functional compounds in combination for treating the aluminum flake pigment.

The use of the silane and phosphorus functional compounds together is thought to have beneficial effects because of different modes of interaction with metal surfaces. When the silane functional and phosphorus compounds are used together, it is preferred to use approximately equal molar amounts of each. The silane-functional compound and the phosphate-functional compound may be used at levels from 1.0% to 40% each, and preferably from 10% to 30% each based on the total weight of the aluminum flake pigment.

When used in coating compositions of the present invention, the total amount of silane and phosphate functional compounds utilized is in an amount between 1.0% and 10% by weight based on the total coating composition weight. When the compounds are used together it is preferred to use approximately equal molar amounts of each.

In the present invention the aluminum pigment treated with the solution of the transition metal salt, rare earth metal salt or mixture thereof, is tested to determine the improvement in resistance of the pigment to corrosion. Corrosion tests were run on untreated aluminum flake pigment samples, samples treated only with the metal salt, and samples treated with both the metal salt and the silane functional and phosphorus functional compounds. The corrosion resistance is determined by a decrease in the amount of hydrogen gas produced by the treated pigments compared to the untreated pigments, in a basic solution of sodium tetraborate, $Na_2B_4O_7$, (borax) having a pH of about 8.0. The method is described below and the gassing results for the aluminum flake pigments of the present invention are set forth in Tables 1–5.

The method for measurement of gassing in the aluminum flake pigment samples is to place a solution of sodium tetraborate in a gassing container. For purposes of the present invention the concentration of the borate solution ranged from 0.0103M to 0.0110M. The gassing apparatus is a 250 ml gas washing bottle attached to a bubble counter with two chambers. The lower chamber is filled with water, through the side neck of the bubble counter. Hydrogen gas formed by release of the $H^+$ ions from the reaction of the aluminum and water, presses water from the lower chamber into the upper chamber of the bubble counter. The volume of water displaced from the lower chamber equals the volume of hydrogen gas generated.

The solution is thermally equilibrated to 60° C. Next the aluminum flake pigment is added and equilibrated to 60° C. Gas evolution is then measured over a period of about 1 to 6 hours.

As shown in the tables following the Detailed Description, the metal salt treated pigments showed lower gassing than the untreated pigments. The pigments treated with both the metal salt and dispersant composition demonstrated the best results for gassing.

The aluminum flake pigment treated with the transition metal and/or rare earth metal salts is useful in aqueous coating compositions. The aluminum flake pigment may be combined with a film-forming resin and water to form a waterborne paint composition. Other ingredients well-known in the art to be useful in such compositions may be included such as crosslinkers and other resins; plasticizers; additional cosolvents to aid in stabilization or application of the composition; rheology control agents; other pigments; UV light stabilizers and antioxidants; catalysts; fungicides; and so on.

Suitable film-forming resins are water-dispersible or water-soluble ionic or nonionic resins. Anionic or nonionic resins are preferred for use in topcoat applications. The resins may be acrylic, vinyl, polyurethane, polyester, alkyd, epoxy, or other polymers known to be useful in films. Examples of water-dispersible polymers used for topcoats are contained in U.S. Pat. Nos. 4,794,147; 4,791,168; and 4,518,724, all of which are incorporated herein by reference. Such systems typically also include a crosslinker, such as aminoplast resins, polyamines, blocked polyisocyanates, and so on, depending on the functionality available for crosslinking on the film forming resin. For example, hydroxyl-functional acrylic or polyurethane resins can be cured using aminoplast resins. For this purpose, melamine-formaldehyde resins are particularly preferred. Melamine-formaldehyde resins of the kind contemplated are commercially available from, for example, Monsanto Co., St. Louis, Mo. and American Cyanamid, Wayne, N.J. A polymeric-type melamine may be used, particularly when the film forming resin is anionically stabilized. Such polymeric-type melamines do not require strong acid catalysis. When the film-forming resin is nonionically stabilized, a polymeric melamine may be used or a monomeric melamine may be used in conjunction with a strong acid catalyst like a sulfonic acid or blocked sulfonic acid.

The film-forming resin or the crosslinker may comprise functionality that can react with a reactive group on the compound of the invention during the curing step. The polymeric network formed during cure would then include a residue of the compound, covalently bonded to the polymeric network. The ability of the compound to react during the curing step is independent of its function in surface modifying the metallic flake pigment.

Additional cosolvents may be added to aid in stabilization or application of the composition. The more preferred solvents are acetates such as butyl acetate, hexyl acetate, and octyl acetate; glycol ethers and glycol ether acetates, such as propylene glycol ether and propylene glycol monomethyl ether acetate; and ketones, such as methyl propyl ketone, methyl isobutyl ketone, and methyl hexyl ketone. Glycol ethers and glycol ether acetates are especially preferred.

Other pigments, if used, are preferably incorporated as pastes or dispersions prepared by using grinding resins or pigment dispersants according to methods well known in the art. The term "pigments" is meant to encompass organic and inorganic compounds that are colored materials, fillers, flake materials, and other materials of kind that the art normally names as pigments. If pigments other than the transition metal or rare earth metal treated aluminum flake pigment are included, they are usually used in an amount of 1% to 200%, based on the total solid weight of the reactants. The surface-modified metallic flake pigments used according to the invention are typically used at amounts of 1% to 30%, based on the total solid weight of the reactants.

It may be desirable to include small amounts of rheology control agents, for example fumed silicas, hectorite clays, bentonite clays, or cellulosics like cellulose acetate butyrate. Such materials are usually used at levels of less than 10% based on the total solid weight of reactants. Rheology control agents are used to control the flow and levelling of the composition during application and curing steps. The rheology control agent is also useful for controlling the metallic appearance of the coating. Such materials may help "fix" the pigment flake surface in an alignment parallel to the surface of the coating to maximize the brightness when viewed head-on and to maximize the darkness when viewed obliquely.

The prepared coating composition is applied to a substrate by any of a number of conventional means, for example by spraying, brushing, dipping or flowing. The preferred methods of application are by spraying or electrostatic spraying. These methods are widely used, especially in the application of automotive coatings. For example, the coating may be applied using a Model 62 syphon spray gun (available from Binks Manufacturing Corp., Franklin Park, Ill.) with 50–80 psi atomizing air pressure.

The substrate to which the coating composition of this invention is to be applied may be, for example, metal, ceramic, plastic, glass, paper, or wood. The substrate may also be any of the aforementioned materials precoated with this or another coating composition. The coating compositions of this invention have been found to be particularly useful over precoated steel or plastic substrates in automotive applications. They are particularly suited for use over primed automotive substrates as topcoat formulations or basecoat formulations that are overcoated with clearcoat formulations.

After application of the coating composition to the substrate, the coating is cured, preferably by heating at a temperature and for a length of time sufficient to cause the conversion of all or nearly all of the reactive groups. The cure temperature is usually from 115° C. to 180° C., and the length of cure is usually 15 minutes to 60 minutes. Preferably, the coating is cured at 120°–150° C. for 20 to 30 minutes. The thickness of the cured coating can be from 1 to 150 microns, but when used as an automotive topcoat or basecoat the coating thickness is generally from 10 to 70 microns.

In a preferred embodiment of the invention, the coating composition of the present invention is used as a basecoat and is overcoated with a transparent topcoat layer, known commonly in the art as a clearcoat. The basecoat may be cured before the clearcoat is applied or the basecoat may be given a wet-on-wet application of a clearcoat. By the term "wet-on-wet" it is meant that after application the basecoat is allowed to flash, or dry, to remove most of the water and other solvent that it contained, but it is not cured before the clearcoat composition is applied. After the clearcoat composition is applied, it is allowed to flash or dry for a period of time, then the basecoat and the clearcoat are cured together.

The clearcoat may be a coating composition according to this invention or another composition known to the art to have utility as a clearcoat. The clearcoat does not necessarily need to use the cure mechanism used by the basecoat, although the cure mechanisms used must not interfere with one another.

The basecoat may be applied in one or two layers, with a short period between application of layers to allow solvent and water to evaporate (termed a "flash" period). After application, the basecoat may be further dried, preferably at a slightly elevated temperature, as in a 120° F. oven, for a period of 5 to 20 minutes before the clear coat composition is applied. The clearcoat composition is preferably applied by spraying, in one layer, or preferably two layers with a short flash between layers. The clearcoat composition is allowed to flash under ambient or heated conditions for 1–20 minutes. The uncured coatings are then cured, usually by thermoset methods as described hereinabove. The resulting appearance and physical properties are excellent.

An aluminum flake containing coating composition prepared according to the present invention applied to an enamel substrate was tested for gassing to determine corrosion resistance of the aluminum flake pigment in the basic pH environment of the coating. The results are set forth in Table 6.

The coating composition was tested for gassing in the gassing apparatus described above. A 250 ml sample of enamel containing aluminum flakes is filled into the gas washing bottle. The assembled apparatus containing the flakes is placed in a 40° C. bath and allowed to equilibrate for 60 minutes. After allowing for equilibration, the screw cap is tightened securely. The sample is tested in the 40° C. water bath at 24 hour intervals to measure the amount of hydrogen gas generated. The acceptable maximum level of generated gas is 4 mils after 30 days.

The following examples are provided to further illustrate the invention.

EXAMPLES

In all examples, aluminum pigment was obtained from Obron Atlantic Corp., Painesville, Ohio.

EXAMPLE 1

Aluminum Flake Pigment Treated with Amonium Cerium Sulfate (Cerium IV)

10 grams of amonium cerium sulfate (($NH_4$)Ce($SO_4$)$_3$ were dissolved in 1000.0 grams of deionized water. 100.1 grams of butyl carbitol were added to the mixture, with stirring. To this mixture was added, with stirring for 1 hours, 160 grams of commercially prepared aluminum flake pigment in mineral spirits to form a slurry, (65% non-volatile content). The slurry was then filtered to remove the solvent and water, and the aluminum flake pigment was oven dried.

EXAMPLE 2

Aluminum Flake Pigment Treated with Cerium Sulfate

This method of preparation removes the mineral spirits present in the commercially available aluminum flake pigment from the aluminum before treatment of the aluminum flake with the cerium salt.

The amonium cerium sulfate, (($NH_4$)Ce($SO_4$)$_3$, 10 grams was dissolved in 1000.0 grams of deionized water. A slurry was formed from 100.1 grams of butyl carbitol and 160.1 grams of aluminum flake pigment in mineral spirits (65% non-volatile content). The cerium salt solution was then added to the aluminum slurry and stirred for 0.5 hours. The slurry was then filtered to remove the solvent and water, and the aluminum flake pigment was oven dried.

EXAMPLE 3

Untreated Aluminum Flake Pigment Slurry (Control)

A slurry was formed from 100.1 grams of butyl carbitol, 1000.0 grams of deionized water. and 160.1 grams of aluminum flake pigment in mineral spirits (65% non-volatile content). The slurry was then filtered to remove the solvent and water, and the aluminum flake pigment was oven dried.

EXAMPLE 4

Aluminum Flake Pigment Treated with Cerium Triacetate (Cerium III)

Cerium Triacetate, (Ce(OAc)$_3$, 1.0 gram, was dissolved in 25 grams deionized water. In a separate vessel, aluminum flake pigment in mineral spirits 80 grams, (65% non-volatile content) was dispersed in 200 grams butyl cellosolve. The cerium salt solution was added to the aluminum slurry and stirred for 24 hours. The mixture was then filtered, washed with toluene to remove the mineral spirits and oven dried for six hours.

EXAMPLE 5

Aluminum Flake Pigment Treated with Nonionic Cerium Isopropoxide

Cerium Isopropoxide, 1.0 gram, was dissolved in 6 grams deionized water. In a separate vessel, aluminum flake pigment in mineral spirits 80 grams, (65% non-volatile content) was dispersed in 180 grams butyl cellosolve. The cerium salt solution was added to the aluminum slurry and stirred for 24 hours. The mixture was then filtered, washed with toluene to remove the mineral spirits and oven dried for six hours.

EXAMPLE 6

Aluminum Flake Pigment Treated with Anionic Amonium Cerium Nitrate

Amonium cerium nitrate (($NH_4$)$_2$Ce($NO_3$)$_6$1.0 gram, was dissolved in 23 grams deionized water. In a separate vessel, aluminum flake pigment in mineral spirits 80 grams, (65% non-volatile content) was dispersed in 175 grams butyl cellosolve. The cerium salt solution was added to the aluminum slurry and stirred for 24 hours. The mixture was then filtered, washed with toluene to remove the mineral spirits and oven dried for six hours.

EXAMPLES 4A–6A

The treated aluminum pigment from examples 4–6 was divided in half prior to filtration. Half was retained as a control and the other half was treated as described below.

EXAMPLE 4A

Sample obtained from example 4 was combined with 1.67 grams of a phosphorus containing compound as described in Example 11, 1.67 grams of a silane containing compound as described in Example 12 and 25 grams of butyl propolsolve. The mixture was then filtered, washed with toluene to remove the mineral spirits and oven dried for six hours.

EXAMPLE 5A

Sample obtained from example 5 was combined with 1.67 grams of a phosphorus containing compound as described in Example 11, 1.67 grams of a silane containing compound as described in Example 12, and 25 grams of butyl propolsolve. The mixture was then filtered, washed with toluene to remove the mineral spirits and oven dried for six hours.

EXAMPLE 6A

Sample obtained from example 6 was combined with 1.67 grams of a phosphorus containing compound as described in Example 11, 1.67 grams of a silane containing compound as described in Example 12, and 25 grams of butyl propolsolve. The mixture was then filtered, washed with toluene to remove the mineral spirits and oven dried for six hours.

EXAMPLE 7

Aluminum Flake Pigment Treated with Phosphate and Silane Compounds with No Metal Salt 40 grams of aluminum flake pigment in mineral spirits (65% non-volatile content) was combined with 1.67 grams of a phosphorus containing compound as described in Example 11, 1.67 grams of a silane containing compound as described in Example 12 and 100 grams butyl cellosolve. The mixture was then filtered, washed with toluene to remove the mineral spirits and oven dried for six hours.

EXAMPLE 8

Aluminum Flake Pigment Treated with Yttrium triacetate

Yttrium triacetate 0.5 gram, was dissolved in 10 grams deionized water. In a separate vessel, aluminum flake pigment in mineral spirits 40 grams, (65% non-volatile content) was dispersed in 100 grams butyl cellosolve. The cerium salt solution was added to the aluminum slurry and stirred for 144 hours. The mixture was then filtered, washed with toluene to remove the mineral spirits and oven dried for six hours.

EXAMPLE 9

Aluminum Flake Pigment Treated with Lanthanum Triacetate

Lanthanum triacetate 0.5 gram, was dissolved in 10 grams deionized water. In a separate vessel, aluminum flake pigment in mineral spirits 40 grams, (65% non-volatile content) was dispersed in 100 grams butyl cellosolve. The cerium salt solution was added to the aluminum slurry and stirred for 144 hours. The mixture was then filtered, washed with toluene to remove the mineral spirits and oven dried for six hours.

EXAMPLE 10

Aluminum Flake Pigment Treated with Cerium Dioxide

Cerium dioxide 0.5 gram, was dissolved in 10 grams deionized water. In a separate vessel, aluminum flake pigment in mineral spirits 40 grams, (65% non-volatile content) was dispersed in 100 grams butyl cellosolve. The cerium salt solution was added to the aluminum slurry and stirred for 144 hours. The mixture was then filtered, washed with toluene to remove the mineral spirits and oven dried for six hours.

Example 11

Preparation of Phosphate-Functional Compound

Part A. Synthesis of Polymeric Backbone

A reactor, equipped with a thermocouple, an add funnel, and a Friedrichs condenser with a drying tube, was charged with 299.5 grams of methyl propyl ketone and heated with stirring to reflux (102° C.). A mixture of 241.5 grams of TMI ® (American Cyanamid Company, Wayne, N.J.), 187.5 grams styrene, 426.6 grams butyl methacrylate, and 42.8 grams Lupersol ® 575-M75 (Elf Atochem North America, Inc., Philadelphia, Pa.) was then added over a period of about 3.5 hours, all the while maintaining the reactor contents at reflux. The reflux temperature at the end of the add was 105° C., and the reflux was held for another 30 minutes. A mixture of 94.7 grams of methyl propyl ketone and 21.4 grams of Lupersol ® 575-M75 was added over a period of twenty minutes. The reaction was held at reflux an hour following the final add. The product had a theoretical solids content of 68.8% and a measured isocyanate content of 0.83 milliequivalents per gram (meq/g).

Part B. Synthesis of Phosphate-Functional Compound

A reactor was charged with 89.8 grams of the polymeric backbone from Part A and 117.2 grams of the polyester/polyether substituent from Example 1-Part B. The theoretical starting isocyanate content was 0.38 meq/g. The contents of the flask were held at about 95° C. until the isocyanate content measured 0.18 meq/g. The reaction mixture was then cooled to 39° C., and 2.3 gram of ethanolamine was added and stirred for 30 minutes. The reactor was equipped with a Barrett-type receiver, and 3.2 grams of polyphosphoric acid and 102.6 grams of toluene were added. The contents of the reactor were held under reflux for an hour. About 0.2 ml of water and 25.7 grams of solvent were removed. The nonvolatiles were measured at 62.2%.

EXAMPLE 12

Preparation of Silane-Functional Compound

Part A. Synthesis of Polymeric Backbone

A reactor was charged with 216.0 grams of methyl amyl ketone and heated with stirring to reflux (152° C.). A mixture of 302.1 grams of TMI ® (American Cyanamid Company, Wayne, N.J.), 52.1 grams styrene, 193.1 grams of butyl acrylate, 213.6 grams butyl methacrylate, and 76.0 grams of a 50% solution of t-butyl peroxy acetate in aromatic solvent (b.p. 162° C.) was then added over a period of about 3 hours, all the while maintaining the reactor contents at reflux. The reflux temperature at the end of the add was 153° C., and the reflux was held for another 30 minutes. A mixture of 57.9 grams of methyl amyl ketone and 38.4 grams of the 50% solution of t-butyl peroxy acetate in aromatic solvent was added over a period of 30 minutes. The reaction was held at reflux for an hour and a half following the final add. The product had a measured solids content of 69.3% and a measured isocyanate content of 1.21 milliequivalents per gram ( meq/g ) .

Part B. Synthesis of the Polyester/Polyether Substituent

A reactor was charged with 325.0 grams of MPEG 2000 (molecular weight 2000, obtained from BASF Corp., Wyandotte, Mich.), 649.9 grams e-caprolactone, and 2.0 mls phosphoric acid. The mixture heated to 140° C. and was held at that temperature for about 8 hours. At the end of the hold, the measured nonvolatiles were 99.6%. The theoretical molecular weight was 6000 Daltons.

Part C. Synthesis of Silane-Functional Compound

A reactor was charged with 972.8 grams of the polymeric backbone from Part A and 674.0 grams of the polyester/polyether substituent from Part B. The contents of the reactor were heated to 117° C. and 6.7 grams of a 1% solution of dibutyl tin dilaurate in methyl propyl ketone was added. The contents of the flask were further heated to 150° C. and held for 10 minutes, then cooled to room temperature. The isocyanate content was measured as 0.547 meq/g. 605.0 grams of this product was charged to a clean, dry reactor, and 7.3 grams of 3-aminopropyltriethoxysilane were added. After eight minutes of stirring, 18.2 grams of ethanolamine were added. The mixture was stirred for another 20 minutes, followed by addition of 224.7 grams of toluene. The nonvolatiles were measured at 60.5%.

EXAMPLE 13

Coating Composition Containing Aluminum Flake Pigments With Cerium Triacetate

Part 1—Pigment Paste

First a pigment paste was formed as follows: 0.2 grams cerium triacetate was added to 20.0 grams deionized water, with mixing for about 5 minutes until dissolved. In a separate vessel, 14.0 grams methoxy propanol acetate were heated to 40° C. 7.3 grams of the phosphorus functional compound of Ex. 11 and 6.8 grams of the silane compound described in Example 12 were then added to the solvent, and stirred for 5 minutes, until dissolved. The cerium solution was then added to the mixture. Next 153.8 grams untreated aluminum flake pigment[a] in mineral spirits (65% NV) were added to the mixture and stirred for 15 minutes. The resultant mixture formed a pigment paste to be added to the coating composition.

Part 2—Slurry

The following ingredients were combined with mixing:

| Cymel ® 327[b] | 20.6 g |
|---|---|
| Butyl Cellosolve | 17.0 g |
| Pluricol ®[c] | 15.8 g |
| Pigment Paste from part 1 | 62.3 g |

[b]A methylated melamine formaldehyde resin, sold under the trademark Cymel ® and available from American Cyanamid Co, Wayne, N.J. 07470.
[c]A surfactant available from BASF Corp., Wyandotte, MI 40192.

This mixture was stirred for 15 minutes.

Part 3

The following ingredients were then added as described below:

| acrylic emulsion resin[d] | 181.5 g |
|---|---|
| dimethylethanol amine(5%) | 10.6 g |
| Viscalex ®-HV30[e] | 5.0 g |
| deionized water | 55.0 g |

| butyl cellosolve | 72.0 g |
|---|---|

[d]Acrylic uncrosslinked core-shell polymeric emulsion resin having 45% non-volatile content.
[e]Rheology control agent sold under the trademark Viscalex ® and available from Allied Colloids Inc. of Suffolk, Va. 23434.

First the dimethylethanol amine was combined with the emulsion resin to adjust the pH to 8.0. Deionized water and Viscalex ® were combined and added to the emulsion mixture, slowly with agitation. To this mixture were added 72 grams butyl cellosolve and 18.7 grams dimethylethanol amine (5%), to achieve a pH of 7.9. 216.8 grams deionized water were added to achieve the desired viscosity of 57 seconds on a #2 Fisher Cup.

[a] Aluminum flake pigment supplied by Obron Atlantic Corp., Painesville, Ohio.

EXAMPLE 14

Coating Composition Containing Aluminum Flake Pigments Treated with Cerium Triacetate A slurry was prepared from:

| 1. Cymel ®[a] 327 | 25.8 g |
|---|---|
| 2. 2-ethylhexanol | 21.3 g |
| 3. Cerium triacetate | 0.25 g |
| 4. Deionized water | 15.0 g |
| 5. Untreated aluminum flake pigment in mineral spirits (65% NV)[b] | 36.5 g |
| 6. Phosphate compound from Ex.11 | 9.1 g |
| 7. Silane compound from Ex.12 | 8.5 g |

[a]A methylated melamine formaldehyde resin, sold under the trademark Cymel ® and available from American Cyanamid Co., Wayne N.J. 07470.
[b]Aluminum flake pigment supplied by Obron Atlantic Corp., Painesville, Ohio.

The cerium triacetate and deionized water were combined with mixing until dissolved. The cerium solution was then added to the Cymel ® 327 and 2-ethyl hexanol and agitated for one minute. The aluminum flake pigment was added to this mixture and agitated for 30 minutes. The silane and phosphate compounds were then added to the mixture and agitated for 15 minutes. An emulsion resin mixture was prepared from:

| acrylic emulsion resin[c] | 226.4 g |
|---|---|
| dimethylethanol amine | 13.4 g |
| Viscolex ® HV-30[d] | 8.4 g |
| deionized water | 92.5 g |
| propylene glycol propyl ether | 90 g |

[c]Acrylic uncrosslinked core-shell polymeric emulsion resin having 45% non-volatile content.
[d]Rheology control agent sold under the trademark Viscalex ® and available from Allied Colloids Inc. of Suffolk, Va. 23434.

First the emulsion resin was neutralized by the addition of the 5% dimethylethanol amine (DMEA). In a separate vessel the Viscalex ® and deionized water were combined, with slight mixing. The Viscalex ® mixture was slowly added to the emulsion resin and 5% DMEA. The propylene glycol propyl ether was then added to the mixture.

The slurry was then slowly added to the emulsion resin mixture with agitation. 29.7 grams 5% DMEA were then added to provide a pH of 8. Deionized water, 170.2 grams was added to obtain a viscosity on a Bohlin V-88 viscometer of 77.5 cP.

EXAMPLE 15

Coating Composition Containing Cerium Triacetate Together with Phosphate Functional and Silane Functional Compounds Coating Composition Containing Aluminum Flake Pigments Treated with Cerium Triacetate A slurry was prepared from:

| | |
|---|---|
| 1. Cymel ®[a] 327 | 25.8 g |
| 2. 2-ethylhexanol | 21.3 g |
| 3. Cerium triacetate | 0.25 g |
| 4. Deionized water | 15.0 g |
| 5. Untreated aluminum flake pigment in mineral spirits (65% NV)[b] | 36.5 g |
| 6. Phosphate compound from Ex.11 | 4.55 g |
| 7. Silane compound from Ex.12 | 4.25 g |

[a]A methylated melamine formaldehyde resin, sold under the trademark Cymel ® and available from American Cyanamid Co., Wayne N.J. 07470.
[b]Aluminum flake pigment supplied by Obron Atlantic Corp., Painesville, Ohio.

The cerium triacetate and deionized water were combined with mixing until dissolved. The cerium solution was then added to the Cymel ® 327 and 2-ethyl hexanol and agitated for one minute. The aluminum flake pigment was added to this mixture and agitated for 2 hours and 15 minutes. The silane and phosphate compounds were then added to the mixture and agitated for 15 minutes. An emulsion resin mixture was prepared from:

| | |
|---|---|
| acrylic emulsion resin[c] | 226.4 g |
| dimethylethanol amine | 13.4 g |
| Viscolex ® HV-30[d] | 8.4 g |
| deionized water | 92.5 g |
| propylene glycol propyl ether | 90 g |

[c]Acrylic uncrosslinked core-shell polymeric emulsion resin having 45% non-volatile content.
[d]Rheology control agent sold under the trademark Viscalex ® and available from Allied Colloids Inc. of Suffolk, Va. 23434.

First the emulsion resin was neutralized by the addition of the 5% dimethylethanol amine (DMEA). In a separate vessel the Viscalex ® and deionized water were combined, with slight mixing. The Viscalex ® mixture was slowly added to the emulsion resin and 5% DMEA. The propylene glycol propyl ether was then added to the mixture.

The slurry was then slowly added to the emulsion resin mixture with agitation. 27.3 grams 5% DMEA were then added to provide a pH of 8. Deionized water, 160.9 grams was added to obtain a viscosity on a Bohlin V-88 viscometer of 100.7 cP.

TABLE 1

Gassing Results for Al pigment treated with Amonium Cerium Sulfate ($(NH_4)_2Ce(SO_4)_3$) of Ex. 1, in 0.011M solution of $Na_2B_4O_7$

| SAMPLE | WT. % SALT[a] | ML HYDROGEN GAS PER HOUR[b] | | | | |
|---|---|---|---|---|---|---|
| | | .5 Hr | 1.25 Hr | 3.25 Hr | 5.25 Hr | 5.75 Hr |
| 1 | 9.6 | 3 | 5 | 6 | 7 | 7 |
| 2 | 9.6 | 2 | 3 | 6 | 11 | 14 |
| 3 (CONTROL) | — | 2 | 5 | 8 | 17 | 22 |

[a]Wt. % is based on total pigment weight.
[b]time measured from when samples sealed in gassing jars.

TABLE 2

Gassing Results for Al Pigment Treated According to Ex. 4–6 with Cerium Triacetate in 0.0103M Solution of $Na_2B_4O_7$

| SAMPLE | WT. % SALT[a] | ML HYDROGEN GAS PER HOUR[b] | | | |
|---|---|---|---|---|---|
| | | .1 Hr | .3 Hr | .45 Hr | .55 Hr |
| 4 | 1.9 | 1 | 6 | 18 | 33 |
| 5 | 1.9 | 1.5 | 7 | 18 | 32 |
| 6 | 1.9 | 4 | 24 | 48 | 72 |
| (control) | — | 3.5 | 16 | 37 | 58 |

[a]Wt. % is based on total pigment weight.
[b]time measured from when samples sealed in gassing jars.

TABLE 3

Gassing Results For Al Pigment Treated with Cerium Triacetate and Silane Functional and Phosphorus Functional Compounds According to Ex. 4A–6A in 0.0103M Solution of $Na_2B_4O_7$

| SAMPLE | WT. % SALT[a] | ML HYDROGEN GAS PER HOUR[b] | | | |
|---|---|---|---|---|---|
| | | .22 Hr | .5 Hr | .75 Hr | 1.0 Hr |
| 4A | 1.9 | 1 | 6.0 | 13.0 | 25.5 |
| 5A | 1.9 | 2 | 6.0 | 13.5 | 30.0 |
| 6A | 1.9 | 1 | 6.5 | 14.0 | 27.0 |
| 7 | — | 3 | 6.5 | 16.5 | 33.0 |
| control | — | 9 | 48.0 | 120.0 | 206.0 |

[a]Wt. % is based on total pigment weight.
[b]time measured from when samples sealed in gassing jars.

TABLE 4

Gassing Results for Al Pigment Treated with Cerium Triacetate and Silane Functional and Phosphorus Functional Compounds Per Ex. 4A–6A in 0.0103M Solution of $Na_2B_4O_7$

| SAMPLE | WT % SALT[a] | ML HYDROGEN GAS PER HOUR[b] | | | | |
|---|---|---|---|---|---|---|
| | | .08 Hr | .3 Hr | .6 Hr | .9 HR | 1.1 Hr |
| 4A | 1.9 | 2.5 | 8 | 28 | 80 | 15[d] |
| 5A | 1.9 | 2.0 | 7 | 27 | 72 | 48 |
| 6A | 1.9 | 3.0 | 11 | 35 | 86 | 48 |
| 7[c] | — | 2.5 | 8 | 34 | 96 | 48 |

[a]Wt % is based on total pigment weight.
[b]Time measured from when samples sealed in gassing jars.
[c]Sample 7 contains silane and phosphorus functional compounds but no cerium salt.
[d]An additional 100 mg cerium triacetate was added to sample 4A only, at .91 Hours.

TABLE 5

Gassing Results for Al pigments Treated with Other Metal Salts Per Ex. 8–10 in 0.0103M Solution of $Na_2B_4O_7$

| SAMPLE | SALT 1.9 Wt. %[a] | ML HYDROGEN GAS PER HOUR | | |
|---|---|---|---|---|
| | | .13 Hr | .27 Hr | .33 Hr |
| Ex. 8 | Y(OAc)$_3$ | 0.5 | 0.5 | 0.5 |
| Ex. 9 | La(OAc)$_3$ | 1.0 | 2.0 | 4.0 |
| Ex. 10 | CeO$_2$ | 12.0 | 34.0 | 50 |
| control | — | 17.0 | 48.0 | 72 |

[a]Wt. % is based on total pigment weight and is the same for samples 8–10.

TABLE 6

Gassing Results for Coatings Prepared According to Ex. 15 and Containing Al Pigments

| SAMPLE | SALT | WT % SALT[a] | ML HYDROGEN GAS PER TIME | | |
|---|---|---|---|---|---|
| | | | 4 DAYS | 7 DAYS | 30 DAYS |
| Example 13 | Ce(Ac)$_3$[b] | .02% | 23 | — | — |
| Example 14 | Ce(Ac)$_3$[b] | .03% | 23 | — | — |
| Example 15 | Ce(Ac)$_3$[b] | .03% | 0 | 0 | 0 |

[a]Wt. % salt is based on total coating composition weight.
[b]Ce(Ac)$_3$ is cerium triacetate.

We claim:

1. A composition, comprising aluminum flake pigment particles surface modified with a metal salt selected from the group consisting of cerium sulfate, cerium triacetate, cerium isopropoxide, ammonium cerium nitrate, yttrium triacetate, lanthanum triacetate, and cerium dioxide and mixtures thereof.

2. The composition of claim 1, wherein the metal salt is selected from the group consisting of salts of transition metals having atomic numbers 21-28; 39-42; 57 and 72-74; and salts of the lanthanide series of rare earth metals having atomic numbers of from 58 to 71.

3. The composition of claim 1, wherein the metal salt is present in an amount effective to protect the surface of the aluminum flake pigment particles from corrosion in an aqueous environment having a basic pH.

4. The composition of claim 1, wherein the metal salt is present in an amount between 0.15% and 10.0% by weight based on total pigment weight.

5. The composition of claim 1, further comprising a pigment dispersant including a polymeric backbone and at least two different substituents, wherein the first substituent has a terminal functionality that is either silane or phosphorus functional compound and the second substituent has a hydrophobic portion and a terminal hydrophilic portion.

6. The composition of claim 5, wherein the dispersant is present in an amount between 1.0 and 40.0% by weight based on total composition weight.

7. A process for treating aluminum flake pigment particles with a metal salt selected from the group consisting of cerium sulfate, cerium triacetate, cerium isopropoxide, amonium cerium nitrate, yttrium triacetate, lanthanum triacetate, and cerium dioxide and mixtures thereof, comprising forming a slurry of aluminum flake pigment particles, metal salt, water, and organic solvent.

8. The process of claim 7, wherein the metal salt is selected from the group consisting of salts of transition metals having atomic numbers 21-28; 39-42; 57 and 72-74; and salts of the lanthanide series of rare earth metals having atomic numbers of from 58 to 71.

9. The process of claim 7, wherein the metal salt is present in an amount effective to protect the surface of the aluminum flake pigment particles from corrosion in an aqueous environment having a basic pH.

10. The process of claims 7, wherein the metal salt is present in an amount between 0.15% and 10.0% by weight based on total pigment weight.

11. The process of claim 7, further comprising the step of adding a pigment dispersant, wherein said dispersant includes a polymeric backbone and at least two different substituents, wherein the first substituent has a terminal functionality that is either silane or phosphorus functional compound and the second substituent has a hydrophobic portion and a terminal hydrophilic portion.

12. The process of claim 11, wherein the dispersant is present in an amount between 1.0% and 40% by weight based on total weight of pigment.

13. An aqueous coating composition, comprising:
 a. An aluminum flake pigment surface modified with at least one compound as described in claim 1,
 b. at least one water-compatible polymer and
 c. A crosslinking agent.

14. A method of making an aqueous coating composition, comprising the steps of:
 a. producing an aluminum flake pigment surface modified with a transition metal or rare earth metal salt selected from the group consisting of cerium sulfate, cerium triacetate, cerium isopropoxide, ammonium cerium nitrate, yttrium triacetate, lanthanum triacetate, and cerium dioxide and mixtures thereof, by mixing the salt with the aluminum flake pigment,
 b. combining the surface modified aluminum flake pigment, water, and at least one water-compatible polymer.

15. A coated article comprising a substrate with a coating thereon, wherein said coating is defined in claim 13.

* * * * *